(12) United States Patent  
Hasegawa et al.

(10) Patent No.: US 11,897,315 B2  
(45) Date of Patent: Feb. 13, 2024

(54) THERMAL MANAGEMENT SYSTEM FOR BATTERY ELECTRIC VEHICLE

(71) Applicants: TOYOTA JIDOSHA KABUSHIKI KAISHA, Toyota (JP); SUBARU CORPORATION, Tokyo (JP)

(72) Inventors: Yoshio Hasegawa, Toyota (JP); Satoshi Furukawa, Kariya (JP); Mitsuyo Omura, Kariya (JP); Yoshihiro Ishihara, Tokyo (JP)

(73) Assignees: TOYOTA JIDOSHA KABUSHIKI KAISHA, Toyota (JP); SUBARU CORPORATION, Tokyo (JP)

( * ) Notice: Subject to any disclaimer, the term of this patent is extended or adjusted under 35 U.S.C. 154(b) by 109 days.

(21) Appl. No.: 17/729,705

(22) Filed: Apr. 26, 2022

(65) Prior Publication Data

US 2022/0371404 A1  Nov. 24, 2022

(30) Foreign Application Priority Data

May 24, 2021  (JP) .................................. 2021-087094

(51) Int. Cl.  
*B60H 1/14* (2006.01)  
*B60H 1/00* (2006.01)

(52) U.S. Cl.  
CPC ......... *B60H 1/143* (2013.01); *B60H 1/00385* (2013.01); *B60H 1/00899* (2013.01); *B60H 2001/00307* (2013.01)

(58) Field of Classification Search  
CPC .......................... B60H 1/143; B60H 1/00385; B60H 1/00899; B60H 2001/00307; B60H 1/00007; B60H 1/00885; B60H 1/03; B60K 1/00; B60K 11/02; B60K 2001/006  
See application file for complete search history.

(56) References Cited

U.S. PATENT DOCUMENTS

| | | | | |
|---|---|---|---|---|
| 3,024,006 | A * | 3/1962 | Stump | F24F 11/30 62/409 |
| 5,695,720 | A * | 12/1997 | Wade | G01N 35/1097 422/62 |
| 9,649,909 | B2 * | 5/2017 | Enomoto | B60W 10/30 |
| 10,232,702 | B2 * | 3/2019 | Nishikawa | B60K 11/04 |
| 10,995,875 | B2 * | 5/2021 | Uto | F01P 7/165 |
| 11,015,516 | B2 * | 5/2021 | Guenter | F01P 7/14 |

(Continued)

FOREIGN PATENT DOCUMENTS

| | | | | |
|---|---|---|---|---|
| CN | 102050006 B | * | 10/2013 | ............. B60K 11/02 |
| DE | 112020002726 T5 | * | 3/2022 | |
| JP | 2012-158197 A | | 8/2012 | |

*Primary Examiner* — Ljiljana V. Ciric  
(74) *Attorney, Agent, or Firm* — Dinsmore & Shohl LLP

(57) ABSTRACT

A thermal management system includes a circulation channel that connects a motor cooler, outside air heat exchanger, and a heater, a switching valve, and a controller. In a heating mode of operating the heater, the controller sets the switching valve in the first valve position when the motor temperature is lower than a motor temperature threshold value, and sets the switching valve in the second valve position when the motor temperature is higher than the motor temperature threshold value. When a load or a load predicted value of the motor exceeds a load threshold value, the controller holds the switching valve in the second valve position during a predetermined holding time.

3 Claims, 4 Drawing Sheets

(56) References Cited

U.S. PATENT DOCUMENTS

| | | | |
|---|---|---|---|
| 11,022,024 B2 * | 6/2021 | Park | F01P 7/165 |
| 11,091,007 B2 * | 8/2021 | Ferraris | B60L 58/27 |
| 11,142,037 B2 * | 10/2021 | Kim | B60H 1/00278 |
| 11,186,164 B2 * | 11/2021 | Gramann | B60K 11/02 |
| 11,214,116 B2 * | 1/2022 | Kim | H01M 10/625 |
| 11,407,273 B2 * | 8/2022 | Kim | B60H 1/00321 |
| 11,518,216 B2 * | 12/2022 | Ishizeki | B60H 1/00278 |
| 11,575,296 B2 * | 2/2023 | Sakamoto | H05K 7/20927 |
| 11,654,744 B2 * | 5/2023 | Kim | B60H 1/00821 62/159 |
| 2012/0180997 A1 * | 7/2012 | Johnston | B60L 58/18 165/104.32 |
| 2012/0205088 A1 * | 8/2012 | Morisita | B60L 1/02 62/243 |
| 2013/0139528 A1 | 6/2013 | Katayama et al. | |
| 2015/0101789 A1 * | 4/2015 | Enomoto | B60H 1/039 236/35 |
| 2015/0204595 A1 * | 7/2015 | Sunderland | F25B 25/005 165/295 |
| 2016/0031288 A1 * | 2/2016 | Nishikawa | B60H 1/00899 165/43 |
| 2016/0297284 A1 * | 10/2016 | Miyakoshi | B60H 1/00907 |
| 2016/0361967 A1 * | 12/2016 | Gawthrop | F25B 21/04 |
| 2021/0296964 A1 * | 9/2021 | Sakamoto | H05K 7/20872 |
| 2022/0212517 A1 * | 7/2022 | Yu | B60H 1/3227 |
| 2022/0371402 A1 * | 11/2022 | Hasegawa | H01M 10/60 |
| 2022/0371404 A1 * | 11/2022 | Hasegawa | B60H 1/143 |

* cited by examiner

THERMAL MANAGEMENT SYSTEM FOR BATTERY ELECTRIC VEHICLE

CROSS-REFERENCE TO RELATED APPLICATION

This application claims priority to Japanese Patent Application No. 2021-087094 filed on May 24, 2021, incorporated herein by reference in its entirety.

BACKGROUND

1. Technical Field

The technology disclosed in the specification relates to a thermal management system for a battery electric vehicle.

2. Description of Related Art

A thermal management system using heat of the outside air for heating of a vehicle cabin is known. One example of the thermal management system is disclosed in Japanese Unexamined Patent Application Publication No. 2012-158197 (JP 2012-158197 A). A heat medium having a lower temperature than the outside air temperature is passed through an outside air heat exchanger, so that the heat medium can absorb heat of the outside air. The vehicle cabin is warmed by use of the heat.

SUMMARY

A battery electric vehicle includes a motor for traveling. The amount of heat generated by the motor is large. The outside air heat exchanger is also used for releasing the heat of the motor to the outside air. If a single outside air heat exchanger can be used for heating (absorption of heat from the outside air) and cooling of the motor (release of heat of the motor to the outside air), a highly efficient thermal management system can be realized. However, if the thermal management system is frequently switched between the absorption of heat from the outside air and the release of heat of the motor to the outside air, severe changes may appear in the temperature, and the system may be damaged. The specification provides a technology for curbing frequent switching between heat release operation and heat absorption operation, in a thermal management system that performs operation (heat release operation) to release heat of the motor to the outside air, and operation (heat absorption operation) to take in heat of the outside air for heating, with a single outside air heat exchanger.

A thermal management system for a battery electric vehicle disclosed in the specification includes a motor for traveling, a motor cooler configured to cool the motor with a heat medium, an outside air heat exchanger configured to exchange heat between the heat medium and an outside air, a heater configured to warm a vehicle cabin using heat of the heat medium, a circulation channel through which the heat medium flows, a switching valve connected to the circulation channel, and a controller configured to control the switching valve. The circulation channel connects the motor cooler, the outside air heat exchanger, and the heater. The switching valve is configured to select a first valve position in which the heat medium circulates between the outside air heat exchanger and the heater and the heat medium is inhibited from flowing between the outside air heat exchanger and the motor cooler, and a second valve position in which the heat medium circulates between the outside air heat exchanger and the motor cooler and the heat medium is inhibited from flowing between the outside air heat exchanger and the heater.

In a heating mode of operating the heater, the controller sets the switching valve in the first valve position when a temperature of the motor is lower than a given motor temperature threshold value, and sets the switching valve in the second valve position when the temperature of the motor is higher than the motor temperature threshold value. When a load or a load predicted value of the motor exceeds a given load threshold value, the controller holds the switching valve in the second valve position during a predetermined holding time, irrespective of the temperature of the motor.

The thermal management system disclosed in the specification holds the switching valve in the second valve position during the predetermined holding time, when the load or load predicted value of the motor is high, so that heat of the motor is sufficiently released to the outside air. Thus, frequent switching between the first valve position and the second valve position is curbed.

The controller may determine the load or the load predicted value of the motor, based on any of the following indexes, i.e., (i) a frequency at which the temperature of the motor exceeds the motor temperature threshold value, (ii) a time interval from a time at which the temperature of the motor becomes lower than the motor temperature threshold value to a time at which the temperature of the motor exceeds the motor temperature threshold value next time, (iii) an integrated value of an output of the motor during a given period of time, (iv) a rate of increase of the temperature of the motor during a given period of time, and (v) a scheduled traveling route of the battery electric vehicle.

Details and further improvements of the technology disclosed in the specification will be described in "DETAILED DESCRIPTION OF EMBODIMENTS" below.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
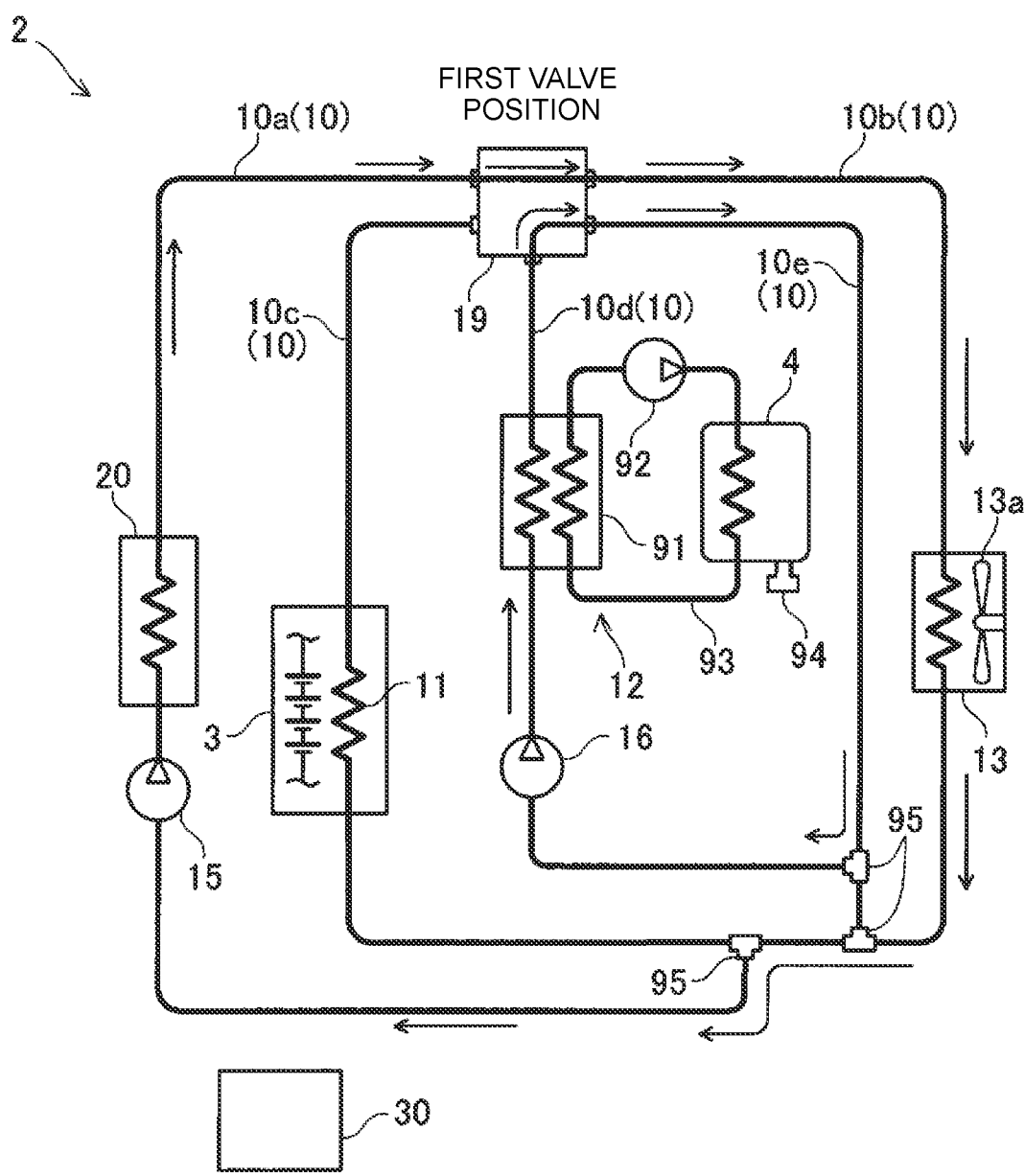
FIG. 1 is a heat circuit diagram of a thermal management system (in a first valve position) of one embodiment.

A thermal management system 2 of one embodiment will be described with reference to the drawings. FIG. 1 is a heat circuit diagram of the thermal management system 2. The "heat circuit" mentioned herein means a circuit of flow channels through which a heat medium flows.

The thermal management system 2 is installed on a battery electric vehicle, and keeps the temperatures of a power supply 3 and a motor 4 for traveling within appropriate temperature ranges, while regulating the temperature of the vehicle cabin. Electric power of the power supply 3 is converted into alternating-current (AC) power suitable for driving of the motor 4 by a power converter (not shown), and supplied to the motor 4. The power supply 3 is typically a battery, such as a lithium-ion battery, or a fuel cell, but may be any other type of power supply. In FIG. 1, power lines are not illustrated.

The thermal management system 2 includes a circulation channel 10 through which the heat medium flows, power supply cooler 11 that cools the power supply 3, motor cooler 12 that cools the motor 4, outside air heat exchanger 13 that exchanges heat between the heat medium and the outside air, air conditioner 20 that regulates the temperature of the vehicle cabin, pumps 15, 16 that feed the heat medium, and a switching valve 19 that switches flow channels of the heat medium.

The circulation channel 10 is a pipe that connects the power supply cooler 11, motor cooler 12, outside air heat exchanger 13, air conditioner 20, and switching valve 19, and allows the heat medium to circulate among the coolers and the air conditioner. For the sake of explanation, the circulation channel 10 is divided into a flow channel 10a that passes through the air conditioner 20, flow channel 10b that passes through the outside air heat exchanger 13, flow channel 10c that passes through the power supply cooler 11, flow channel 10d that passes through the motor cooler 12, and bypass channel 10e that bypasses the outside air heat exchanger 13.

The air conditioner 20 regulates the temperature of the vehicle cabin. The air conditioner 20 operates in a cooling mode in which it cools the vehicle cabin, and a heating mode in which it warms the vehicle cabin. In FIG. 1, the air conditioner 20 is depicted in a simplified form. The detailed structure of the air conditioner 20 will be described later.

The power supply cooler 11 cools the power supply 3. The heat medium that passes through the power supply cooler 11 absorbs heat of the power supply 3, and cools the power supply 3.

The outside air heat exchanger 13 includes a fan 13a. The outside air led by the fan 13a into the outside air heat exchanger 13 exchanges heat with the heat medium that passes through the outside air heat exchanger 13. The outside air heat exchanger 13 is generally called "radiator", but is called "outside air heat exchanger" in this embodiment since heat may be transferred from the outside air to the heat medium.

The motor cooler 12 includes an oil cooler 91, oil pump 92, and oil channel 93. The flow channel 10d passes through the oil cooler 91. The oil channel 93 passes through the oil cooler 91 and the motor 4. Oil flows in the oil channel 93. The oil pump 92 is disposed in the oil channel 93, and circulates the oil between the oil cooler 91 and the motor 4. The motor 4 is cooled with the heat medium flowing in the circulation channel 10. More specifically, the heat medium cools the oil in the oil cooler 91, and the cooled oil cools the motor 4. The heat of the motor 4 is absorbed by the heat medium via the oil.

The thermal management system 2 includes a temperature sensor 94 that measures the temperature of the motor 4. The thermal management system 2 further includes many temperature sensors, but these sensors will not be described. Measurement values of the temperature sensor 94 and other temperature sensors are transmitted to a controller 30. The controller 30 controls the pumps 15, 16, oil pump 92, and switching valve 19, based on the measurement values of the temperature sensor 94, etc.

Each of the flow channels 10a to 10e is connected at one end to the switching valve 19. The switching valve 19 changes the relationship of connection between the flow channels 10a to 10e. The relationship of connection between two or more flow channels in the switching valve 19 will be described in detail later. The respective other ends of the flow channels 10a to 10e are coupled to each other with some three-way valves 95. The pumps 15, 16 are disposed in the circulation channel 10. The pump 15 is disposed in the flow channel 10a upstream of the air conditioner 20, and the pump 16 is disposed in the flow channel 10d upstream of the motor cooler 12. In FIG. 1, arrows depicted along the flow channels represent directions of flow of the heat medium. The pumps 15, 16 push the heat medium toward the switching valve 19. The flow path of the heat medium is determined depending on the state of the switching valve 19. The direction of flow of the heat medium in each of the three-way valves 95 is dependently determined, according to the relationship of connection between the flow channels 10a to 10e determined by the switching valve 19.

The switching valve 19 can select a first valve position and a second valve position. FIG. 1 shows the flow of the heat medium when the switching valve 19 selects the first valve position. When selecting the first valve position, the switching valve 19 connects the flow channel 10a to the flow channel 10b, and connects the flow channel 10d to the bypass channel 10e. At this time, the heat medium circulates between the air conditioner 20 and the outside air heat exchanger 13, and circulates between the motor cooler 12 and the bypass channel 10e. When the switching valve 19 selects the first valve position, the heat medium that circulates between the air conditioner 20 and the outside air heat exchanger 13 is not mixed with the heat medium that passes through the motor cooler 12. In other words, when the switching valve 19 selects the first valve position, the heat medium circulates between the air conditioner 20 and the outside air heat exchanger 13, and the heat medium is inhibited from flowing between the motor cooler 12 and the outside air heat exchanger 13.

In the heating mode, the switching valve 19 selects the first valve position, so that the heat medium circulates between the outside air heat exchanger 13 and the air conditioner 20. The structure of the air conditioner 20 will be described in detail later. In the heating mode, the air conditioner 20 absorbs heat from the heat medium until the temperature of the heat medium becomes lower than the temperature of the outside air, and uses the heat thus absorbed for heating of the vehicle cabin. The heat medium of which the temperature becomes lower than that of the outside air is fed to the outside air heat exchanger 13, and absorbs heat from the outside air in the outside air heat exchanger 13.

Figure 2:
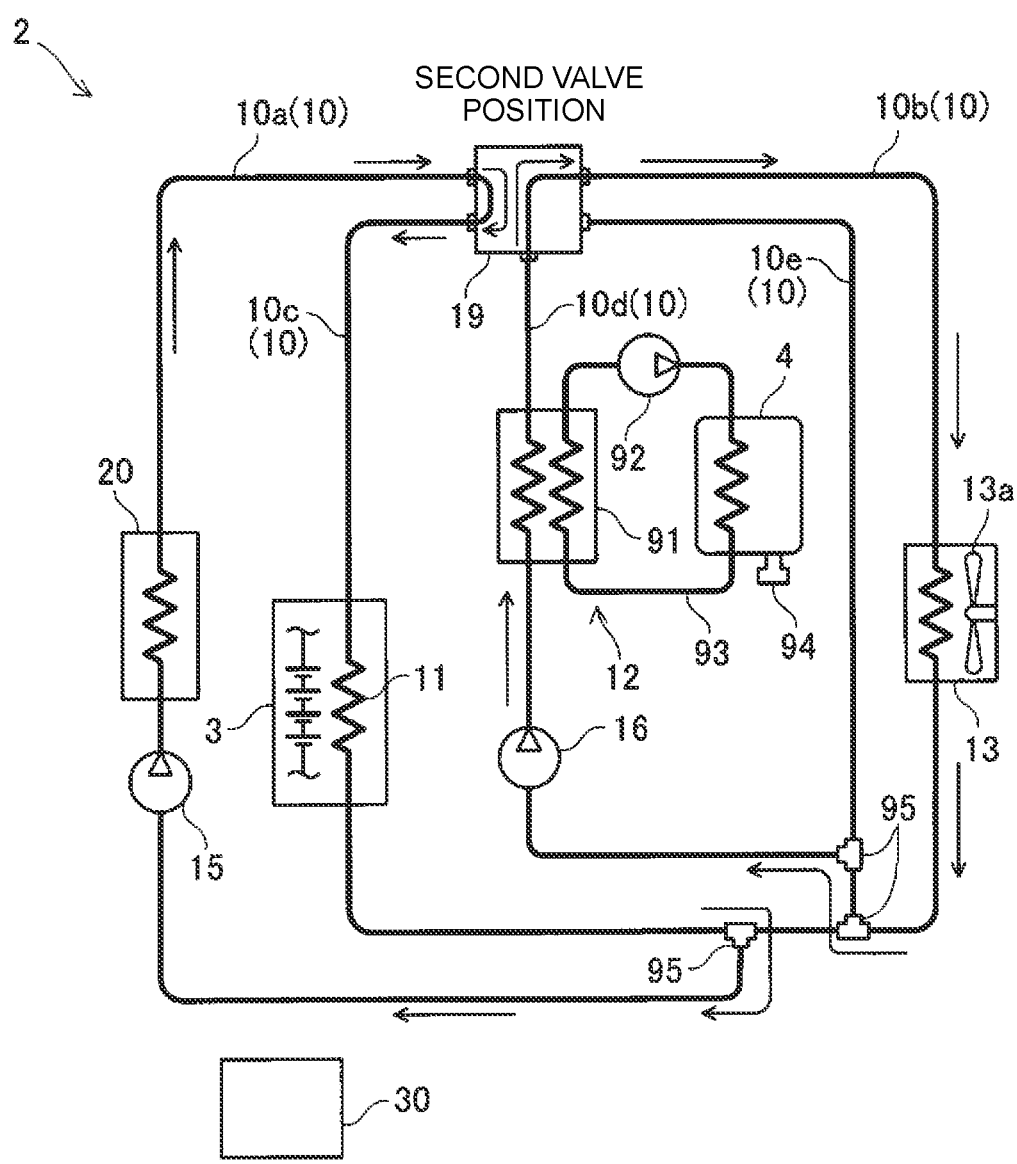
FIG. 2 is a heat circuit diagram of the thermal management system (in a second valve position) of the embodiment.

FIG. 2 shows the flow of the heat medium when the switching valve 19 selects the second valve position. When selecting the second valve position, the switching valve 19 connects the flow channel 10a to the flow channel 10c, and connects the flow channel 10b to the flow channel 10d. At this time, the heat medium circulates between the air conditioner 20 and the power supply cooler 11, and circulates between the motor cooler 12 and the outside air heat exchanger 13. In other words, when the switching valve 19 selects the second valve position, the heat medium circulates between the motor cooler 12 and the outside air heat exchanger 13, and the heat medium is inhibited from flowing between the air conditioner 20 and the outside air heat exchanger 13.

As described above, in the heating mode, the first valve position is selected, and the heat medium circulates between the air conditioner 20 and the outside air heat exchanger 13. When the temperature of the motor 4 exceeds a motor temperature threshold value, the controller 30 switches the switching valve 19 to the second valve position, even in the heating mode. When the second valve position is selected, the heat medium circulates between the motor cooler 12 and the outside air heat exchanger 13. The heat of the motor 4 is absorbed by the heat medium in the motor cooler 12. The heat medium having a high temperature is fed to the outside air heat exchanger 13, and releases heat to the outside air.

Figure 3:
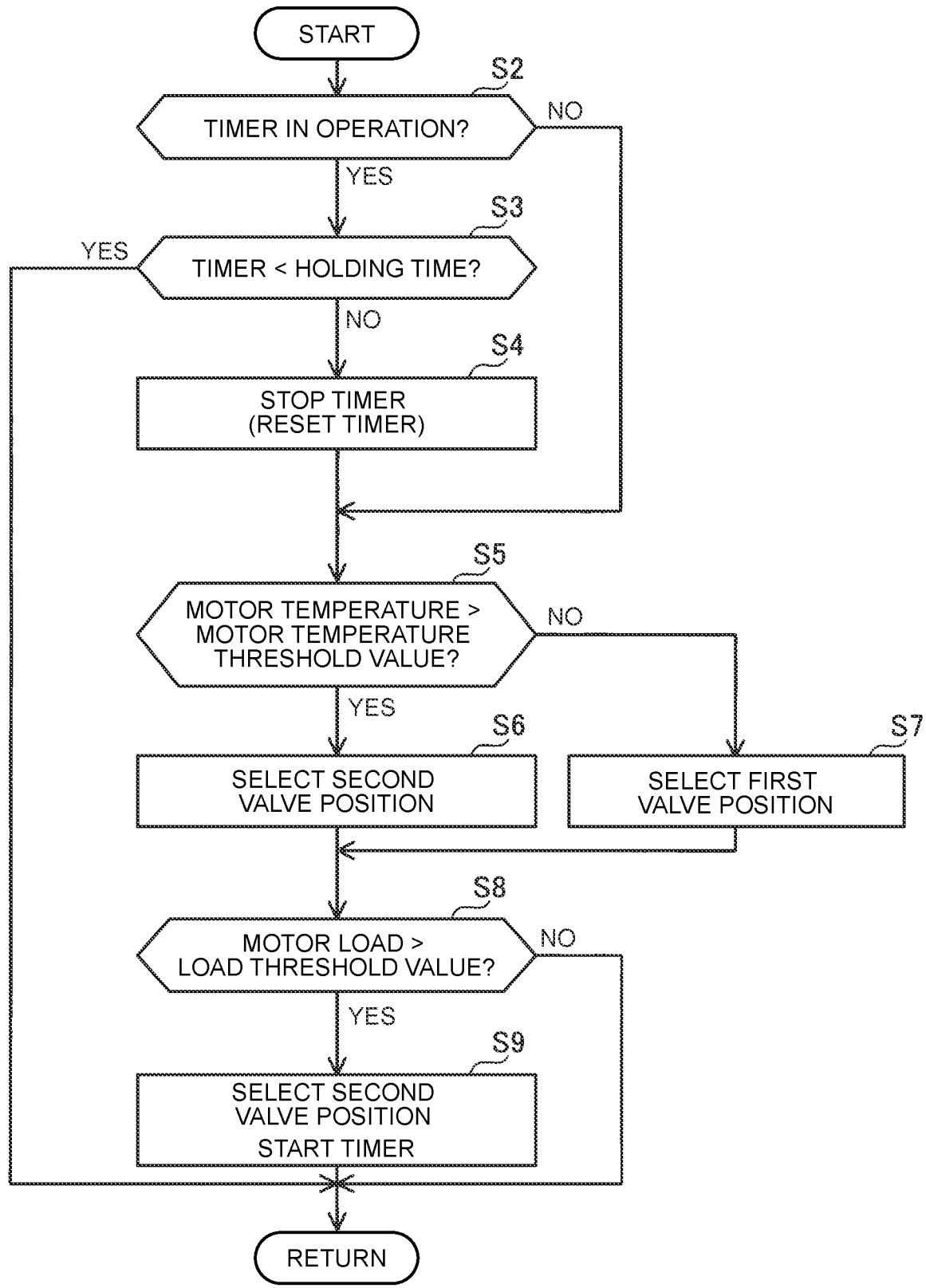
FIG. 3 is a flowchart of a process of a controller in a heating mode.

When the heating mode is selected, the air conditioner 20 warms the vehicle cabin. FIG. 3 shows a flowchart of a process of the controller 30 during heating. When the timer is in operation in step S2, the controller 30 compares the elapsed time indicated by the timer, with a predetermined holding time (step S2: YES, S3). The timer is a variable defined in a program executed by the controller 30, and measures the time elapsed from the start of the timer. The timer starts in step S9 that will be described later. A condition under which the timer starts will be described later. Since the timer is normally stopped, a negative decision "NO" is obtained in step S2, and the controller 30 proceeds to step S5.

The controller 30 compares the temperature (motor temperature) of the motor 4 with the motor temperature threshold value (step S5). The motor temperature is obtained by the temperature sensor 94 provided in the motor 4. When the motor temperature is lower than the motor temperature threshold value, the controller 30 controls the switching valve 19 so as to select the first valve position (step S5: NO, S7). Instead of using the measurement value of the temperature sensor 94, the temperature of the heat medium that has passed through the motor cooler 12 may be used as an estimated value of the motor temperature.

As shown in FIG. 1, when the switching valve 19 selects the first valve position, the heat medium circulates between the air conditioner 20 and the outside air heat exchanger 13. At this time, the heat medium is inhibited from moving between the motor cooler 12 and the outside air heat exchanger 13. The air conditioner 20 absorbs heat from the heat medium until the temperature of the heat medium becomes lower than the temperature of the outside air, and warms the vehicle cabin with the heat. The structure of the air conditioner 20 will be described later. The heat medium of which the temperature becomes lower than that of the outside air is fed to the outside air heat exchanger 13, and absorbs heat from the outside air in the outside air heat exchanger 13.

When the motor temperature is higher than the motor temperature threshold value, the controller 30 controls the switching valve 19 so as to select the second valve position (step S5: YES, S6). As shown in FIG. 2, when the switching valve 19 selects the second valve position, the heat medium circulates between the motor cooler 12 and the outside air heat exchanger 13. The heat of the motor 4 is released to the outside air in the outside air heat exchanger 13. When the switching valve 19 selects the second valve position, the heat of the motor 4 is actively released to the outside air, so that the temperature of the motor 4 is lowered.

When the switching valve 19 selects the second valve position, the heat medium is inhibited from flowing between the air conditioner 20 and the outside air heat exchanger 13. The heat medium circulates between the air conditioner 20 and the power supply cooler 11. The heat medium absorbs heat from the power supply 3 in the power supply cooler 11. The air conditioner 20 warms the vehicle cabin using heat of the power supply 3.

More precisely, in step S5, the controller 30 selects the first valve position when the motor temperature becomes lower than a value obtained by subtracting a margin temperature from the motor temperature threshold value. The margin temperature is provided for preventing hunting of the switching valve 19. In FIG. 3, a process for preventing hunting is omitted.

Subsequently, the controller 30 compares the load of the motor (motor load) with a load threshold value (step S8). The motor load will be described later. When the motor load exceeds the load threshold value, the controller 30 sets the switching valve 19 in the second valve position, and starts the timer (step S8: YES, S9). On the other hand, when the motor load is smaller than the load threshold value, the controller 30 finishes the process without starting the timer (step S8: NO).

The controller 30 repeats the process of FIG. 3 at regular intervals. After the timer starts in step S9, the switching valve 19 is held in the second valve position, irrespective of the motor temperature, until a predetermined holding time elapses (step S2: YES, step S3: YES, RETURN). On the other hand, when the predetermined holding time elapses after the time starts in step S9, the controller 30 stops the timer, and executes step S5 and subsequent steps (step S2: YES, S3: NO, S4). In step S4, the controller 30 stops the timer, and resets the value of the timer to zero at the same time.

The advantages of the operation to hold the switching valve 19 in the second valve position during the holding time when the motor load exceeds the load threshold value will be described. The motor load is determined based on the frequency at which the motor temperature exceeds the motor temperature threshold value, for example. Alternatively, the motor load is determined based on the integrated value of the output of the motor 4 within the latest predetermined time. In either case, the high motor load in the heating mode means that switching between the first valve position and the second valve position takes place frequently.

As described above, in the heating mode, the heat medium of which the temperature is lower than the outside air flows into the outside air heat exchanger 13 while the switching valve 19 is held in the first valve position. On the other hand, while the switching valve 19 is held in the second valve position, the high-temperature heat medium warmed by heat of the motor 4 flows into the outside air heat exchanger 13. When the motor load is high, the low-temperature heat medium and the high-temperature heat medium frequently and alternately pass through the outside air heat exchanger 13, switching valve 19, and flow channel 10*b*. Namely, when the motor load is high, devices, such as the outside air heat exchanger 13, switching valve 19, and flow channel 10*b*, are subjected to a severe thermal cycle.

In the thermal management system 2 of the embodiment, the switching valve 19 is held in the second valve position during the predetermined holding time when the motor load exceeds the load threshold value. As the second valve position is maintained during the predetermined holding time, the temperature of the motor 4 becomes significantly lower than the motor temperature threshold value. Therefore, after the switching valve 19 is returned to the first valve position upon a lapse of the holding time, the motor temperature does not exceed the motor temperature threshold value for a while even if the motor load is high. Namely, the switching frequency of the switching valve 19 is reduced.

The thermal management system 2 can perform operation to release heat of the motor 4 to the outside air (heat release operation), and operation to take in heat of the outside air for heating (heat absorption operation), in the single outside air heat exchanger 13. Then, the thermal management system 2 can curb frequent switching between the heat release operation and the heat absorption operation even when the motor load is high.

The motor load is determined based on any of (i) the frequency at which the motor temperature exceeds the motor temperature threshold value, (ii) the time interval from the time when the motor temperature becomes lower than the motor temperature threshold value to the time when it exceeds the motor temperature threshold value next time, (iii) the integrated value of the output of the motor during the latest predetermined time, (iv) the rate of increase of the motor temperature during the latest predetermined time, and (v) the scheduled traveling route of the battery electric vehicle.

In step S8, a motor load predicted value may be used in place of the motor load. Namely, the controller 30 controls the switching valve 19 to select the second valve position when the motor load predicted value exceeds the load threshold value, and starts the timer. When the scheduled traveling route includes a long uphill road, for example, the motor load predicted value becomes large. When the rate of increase of the motor temperature during the latest predetermined time is large, too, the motor load predicted value becomes large.

Figure 4:
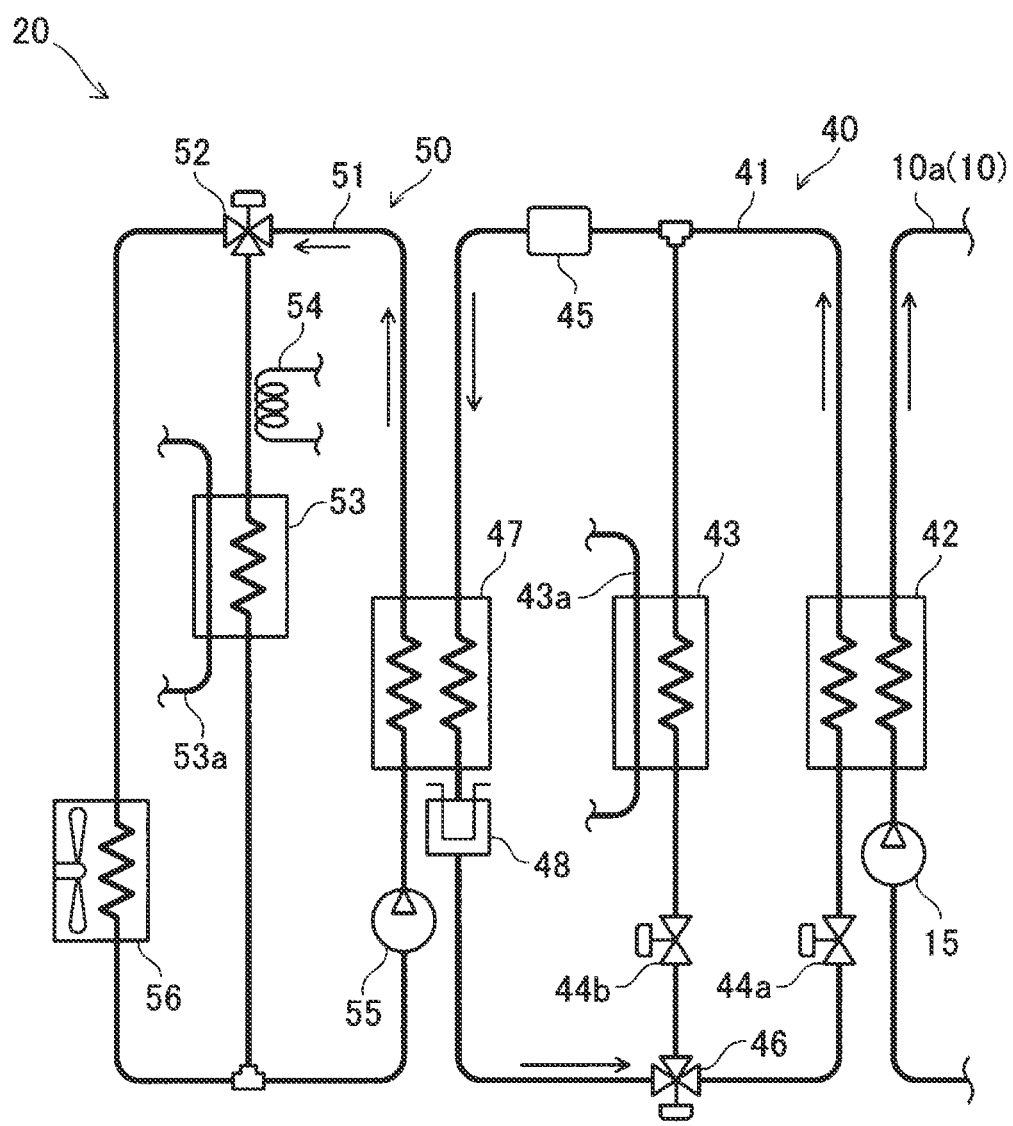
FIG. 4 is a heat circuit diagram of an air conditioner.

Referring to FIG. 4, the structure of the air conditioner 20 will be described. The air conditioner 20 includes a first heat circuit 40 and a second heat circuit 50. The first heat circuit 40 cools the vehicle cabin, and the second heat circuit 50 warms the vehicle cabin. The first heat circuit 40 also plays a role of transferring heat of the heat medium flowing in the circulation channel 10 to the second heat circuit 50 during heating. In the following description, a thermal circuit in which the heat medium circulates between the outside air heat exchanger 13 (or the power supply cooler 11) and the air conditioner 20 (namely the circulation channel 10 and the devices connected to the circulation channel 10) will be called "main thermal circuit" for the sake of explanation.

The first heat circuit 40 includes a circulation channel 41, chiller 42, evaporator 43, expansion valves 44a, 44b, compressor 45, heat exchanger 47, switching valve 46, and modulator 48. The circulation channel 41 connects the chiller 42, evaporator 43, and heat exchanger 47. A first heat medium flows in the circulation channel 41. The switching valve 46 switches the flow path of the first heat medium. In the heating mode, the controller 30 controls the switching valve 46, so that the first heat medium circulates between the chiller 42 and the heat exchanger 47, and the first heat medium does not flow into the evaporator 43.

The first heat medium, which is a liquid, is evaporated as it passes through the expansion valve 44a, and its temperature lowers. In the case of the heating mode, the temperature of the first heat medium is lowered to a lower level than that of the outside air. The first heat medium of which the temperature is reduced to be lower than that of the outside air absorbs heat from the heat medium of the main thermal circuit in the chiller 42, and its temperature rises. The first heat medium (gas) that has passed the chiller 42 is compressed in the compressor 45 and condensed, and its temperature further rises. The high-temperature first heat medium is supplied to the heat exchanger 47. The first heat medium that has passed through the heat exchanger 47 is fed to the switching valve 46 via the modulator 48.

The second heat circuit 50 includes a circulation channel 51, vehicle cabin heater 53, pump 55, radiator 56, and switching valve 52. The circulation channel 51 connects the heat exchanger 47, vehicle cabin heater 53, and radiator 56. A second heat medium flows in the circulation channel 51. The circulation channel 51 is provided with a pump 55, and the pump 55 circulates the second heat medium. The switching valve 52 switches the flow path of the second heat medium. In the heating mode, the controller 30 controls the switching valve 52, so that the second heat medium circulates between the heat exchanger 47 and the vehicle cabin heater 53, and the second heat medium does not flow into the radiator 56.

As described above, the high-temperature first heat medium flows into the heat exchanger 47. In the heating mode, the second heat medium absorbs heat from the first heat medium in the heat exchanger 47. The second heat medium of which the temperature has been elevated by heat of the first heat medium passes through the vehicle cabin heater 53. An air duct 53a through which air in the vehicle cabin flows also passes through the vehicle cabin heater 53. In the vehicle cabin heater 53, the air in the vehicle cabin is warmed by the high-temperature second heat medium. When the thermal energy of the second heat medium is small, the controller 30 warms the second heat medium using an electric heater 54. In the heating mode, the heat of the power supply 3 or the heat of the outside air warms the vehicle cabin, from the heat medium of the main heat circuit, via the first heat medium and the second heat medium. In the first heat circuit 40, the first heat medium of which the temperature has been lowered through evaporation receives heat from the heat medium of the main heat circuit, and the first heat medium of which the temperature is further raised through compression and condensation transfers heat to the second heat medium. With this cycle, heat can be transferred between the power supply 3 (or outside air) and the vehicle cabin having a small temperature difference. This cycle that transfers heat between two heat circuits having a small temperature difference is called "heat pump".

In the heating mode, the air conditioner 20 absorbs heat from the heat medium of the main heat circuit, using the low-temperature first heat medium evaporated. The air conditioner 20 absorbs heat from the heat medium of the main heat circuit until the temperature of the heat medium of the main heat circuit becomes lower than the temperature of the outside air, and warms the vehicle cabin.

In the cooling mode, the controller 30 controls the switching valve 46, so that the first heat medium circulates between the evaporator 43 and the heat exchanger 47, and the first heat medium does not flow into the chiller 42. An air duct 43a through which air in the vehicle cabin flows also passes through the evaporator 43. The first heat medium, which is a liquid, turns into a gas in the expansion valve 44b, and its temperature is lowered. The first heat medium of which the temperature is lowered cools the air in the vehicle cabin with the evaporator 43. The first heat medium (gas) that has passed through the evaporator 43 is compressed by the compressor 45 and condensed, and its temperature rises. The high-temperature first heat medium is supplied to the heat exchanger 47, and transfers heat to the second heat medium of the second heat circuit 50. In the cooling mode, the controller 30 controls the switching valve 52 so that the second heat medium circulates between the heat exchanger 47 of the second heat circuit 50 and the radiator 56, and the second heat medium does not flow into the vehicle cabin heater 53. The heat of the second heat medium is released to the outside air in the radiator 56. The first heat medium that has been cooled in the heat exchanger 47 is fed to the switching valve 46 via the modulator 48, and evaporated in the expansion valve 44b so that its temperature is further lowered.

The air conditioner 20 operating in the heating mode corresponds to one example of the heater that warms the vehicle cabin.

While specific examples of the disclosure have been described in detail, these are merely exemplary, and are not intended to limit the appended claims. The technologies stated in the claims include those obtained by modifying or changing the illustrated specific examples in various ways. The technical elements described in the specification or the drawings exhibit technical usefulness alone or in various combinations, and are not limited to the combinations stated in the claims as filed. Also, the technologies illustrated in the specification or the drawings can accomplish two or more objects at the same time, and have technical usefulness when accomplishing any one of the objects.

What is claimed is:

1. A thermal management system for a battery electric vehicle, comprising:
    a motor for traveling;
    a motor cooler configured to cool the motor with a heat medium;
    an outside air heat exchanger configured to exchange heat between the heat medium and an outside air;
    a heater configured to warm a vehicle cabin using heat of the heat medium;
    a circulation channel through which the heat medium flows, the circulation channel connecting the motor cooler, the outside air heat exchanger, and the heater;
    a switching valve connected to the circulation channel, and configured to select a first valve position in which the heat medium circulates between the outside air heat exchanger and the heater and the heat medium is inhibited from flowing between the outside air heat exchanger and the motor cooler, and a second valve position in which the heat medium circulates between the outside air heat exchanger and the motor cooler and the heat medium is inhibited from flowing between the outside air heat exchanger and the heater; and
    a controller configured to control the switching valve,
    wherein, in a heating mode of operating the heater, the controller sets the switching valve in the first valve position when a temperature of the motor is lower than a given motor temperature threshold value, and sets the switching valve in the second valve position when the temperature of the motor is higher than the motor temperature threshold value, and
    wherein, in the heating mode, when a load or a load predicted value of the motor exceeds a given load threshold value, the controller holds the switching valve in the second valve position during a predetermined holding time, irrespective of the temperature of the motor.

2. The thermal management system according to claim 1, wherein the controller determines the load or the load predicted value, based on any of i) a frequency at which the temperature of the motor exceeds the motor temperature threshold value, ii) a time interval from a time at which the temperature of the motor becomes lower than the motor temperature threshold value to a time at which the temperature of the motor exceeds the motor temperature threshold value next time, iii) an integrated value of an output of the motor during a given period of time, iv) a rate of increase of the temperature of the motor during a given period of time, and v) a scheduled traveling route of the battery electric vehicle.

3. The thermal management system according to claim 1, wherein the heater includes a heat pump mechanism configured to absorb heat from the heat medium, using another heat medium that is evaporated.

* * * * *